United States Patent
Barnard et al.

(10) Patent No.: US 7,020,106 B2
(45) Date of Patent: Mar. 28, 2006

(54) RADIO COMMUNICATION SYSTEM

(75) Inventors: Michael E. Barnard, Redhill (GB);
Timothy J. Moulsley, Caterham (GB);
Bernard Hunt, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1056 days.

(21) Appl. No.: 09/920,041

(22) Filed: Aug. 1, 2001

(65) Prior Publication Data

US 2002/0024937 A1    Feb. 28, 2002

(30) Foreign Application Priority Data

Aug. 10, 2000 (GB) .................................. 0019534

(51) Int. Cl.
*H04Q 7/00*    (2006.01)
(52) U.S. Cl. ...................................... 370/329; 370/278
(58) Field of Classification Search ................ 370/278, 370/277, 281, 329, 294, 295, 330, 334, 347, 370/431, 436, 442, 344
See application file for complete search history.

(56) References Cited

U.S. PATENT DOCUMENTS

| 5,956,331 | A  |   | 9/1999 | Rautiola et al. ............ 370/338 |
| 6,122,263 | A  | * | 9/2000 | Dahlin et al. ............... 370/329 |
| 6,791,952 | B1 | * | 9/2004 | Lin et al. .................... 370/281 |
| 6,795,413 | B1 | * | 9/2004 | Uhlik ......................... 370/330 |

FOREIGN PATENT DOCUMENTS

| GB | 2330729   | 4/1999 |
| WO | WO0022753 | 4/2000 |

* cited by examiner

*Primary Examiner*—Brian Nguyen
(74) *Attorney, Agent, or Firm*—Larry Liberchuk (57) ABSTRACT

A radio communication system a primary station and a secondary station operating according to two (or more) two-way communication modes. An uplink and/or a downlink communication channel is present for the first mode, but only one of an uplink and a downlink channel is present for the second mode. Modifications to the protocols of the first and second modes enable the traffic for an absent communication channel of one mode to be carried by the corresponding channel of the other mode.

18 Claims, 6 Drawing Sheets

FIG. 9

RADIO COMMUNICATION SYSTEM

The present invention relates to a radio communication system operating according to at least two modes and further relates to primary and secondary stations for use in such a system and to a method of operating such a system.

A range of future applications for wireless terminals will generate asymmetric data flow, for example downloading of audio or video data from the Internet. In such applications the data rate transmitted over a downlink channel (from a base station to a mobile terminal) is much greater than that transmitted over an uplink channel, since the downlink carries the downloading data while the uplink may only carry control information. In other applications the data rate transmitted over an uplink channel may be much greater than that over a downlink channel, for example transmitting video data from a mobile handset to a central server.

Such asymmetrical connections can be provided in some networks. One example is a fixed Internet connection used for web browsing, where a user typically downloads significant quantities of data while the uplink mainly carries requests for web pages or data files. Digital television systems employing a set-top box also have an asymmetrical connection, with a high capacity downlink channel (provided by a broadcast system) together with a low bit rate uplink (provided by a telephone system). The possibility of using a cellular or cordless connection for the uplink has also been considered.

However, in most wireless systems a major concern is inefficient use of spectrum when asymmetric traffic is being carried. This is particularly an issue in Frequency Division Duplex (FDD) systems, where the spectrum is usually allocated to provide equally-sized pairs of bands in uplink and downlink. When such a system is used for web browsing or video downloading the downlink band may be operating at full capacity while the uplink band is substantially empty.

One solution to this problem is to use Time Division Duplex (TDD) and have different numbers of time slots allocated to uplink and downlink transmissions. Another is for a radio communication system to comprise multi-mode terminals, capable of operating according to a plurality of cellular, cordless or Wireless Local Area Network (WLAN) standards. For example, a system could employ UMTS (Universal Mobile Telecommunication System) TDD mode to provide a low data rate connection and a HIPERLAN/2 (High PErformance Radio Local Area Network type 2) WLAN to provide a high data rate connection. UMTS typically operates at about 2 GHz with date rates of up to about 2 Mbit/s, while HIPERLAN/2 operates at above 5 GHz with data rates of the order of 20 Mbit/s. The high bit rate downlink services would be provided by the higher bit rate system.

Proposed multi-mode terminals operating according to standards with significantly different characteristics, such as UMTS TDD mode and HIPERLAN/2, would need to incorporate enough hardware to operate a full bi-directional link in each of the supported systems. An example of such a system is disclosed in U.S. Pat. No. 5,956,331, in which a dual-mode terminal can act as a HIPERLAN terminal within the coverage area of a WLAN while acting as a normal GSM (Global System for Mobile communications) terminal elsewhere. There might be some scope for sharing of hardware, but this becomes difficult if simultaneous operation of a plurality of systems is required. The provision of at least two complete transceiver architectures in a wireless terminal makes such terminals relatively expensive.

According to the prior art, there are at least two additional ways in which a multi-mode terminal could be used. One is completely independent functioning of the different modes. Another is to support handover of a connection from one radio system to another. In this latter case it is usual for a terminal connected to one system to make measurements of transmissions from another system. On this basis a handover might be initiated. These measurements may be made independently or during pauses in the operation of the first system.

An object of the present invention is to provide a more economical multi-mode system.

According to a first aspect of the present invention there is provided a radio communication system having a communication channel between a primary station and a secondary station, the primary and secondary stations having means for communicating according to first and second two-way communication modes, wherein the communication channel comprises at least one of an uplink and a downlink channel for the first mode and one of an uplink and a downlink channel for the second mode, the other channel for the second mode being absent, and means are provided for transmitting and receiving data normally routed via an absent channel of one mode via a respective channel of the other mode.

According to a second aspect of the present invention there is provided a primary station for use in a radio communication system having a communication channel between the primary station and a secondary station, wherein means are provided for communicating according to first and second two-way communication modes, the communication channel comprises at least one of an uplink and a downlink channel for the first mode and one of an uplink and a downlink channel for the second mode, the other channel for the second mode being absent, and means are provided for transmitting or receiving data normally routed via an absent channel of one mode via a respective channel of the other mode.

According to a third aspect of the present invention there is provided a secondary station for use in a radio communication system having a communication channel between a primary station and the secondary station, wherein means are provided for communicating according to first and second two-way communication modes, the communication channel comprises at least one of an uplink and a downlink channel for the first mode and one of an uplink and a downlink channel for the second mode, the other channel for the second mode being absent, and means are provided for transmitting or receiving data normally routed via an absent channel of one mode via a respective channel of the other mode.

According to a fourth aspect of the present invention there is provided a method of operating a radio communication system having a communication channel between a primary station and a secondary station, wherein the system supports communications according to first and second two-way communication modes, the communication channel comprises at least one of an uplink and a downlink channel for the first mode and one of an uplink and a downlink channel for the second mode, the other channel for the second mode being absent, and the method comprises transmitting and receiving data normally routed via an absent channel of one mode via a respective channel of the other mode.

The present invention is based upon the recognition, not present in the prior art, that in a multi-mode terminal where each mode would be bi-directional if operated in a single mode terminal, it is not necessary for all the modes to have a bi-directional link.

Embodiments of the present invention will now be described, by way of example, with reference to the accompanying drawings, wherein.

In the drawings the same reference numerals have been used to indicate corresponding features.

Figure 1:
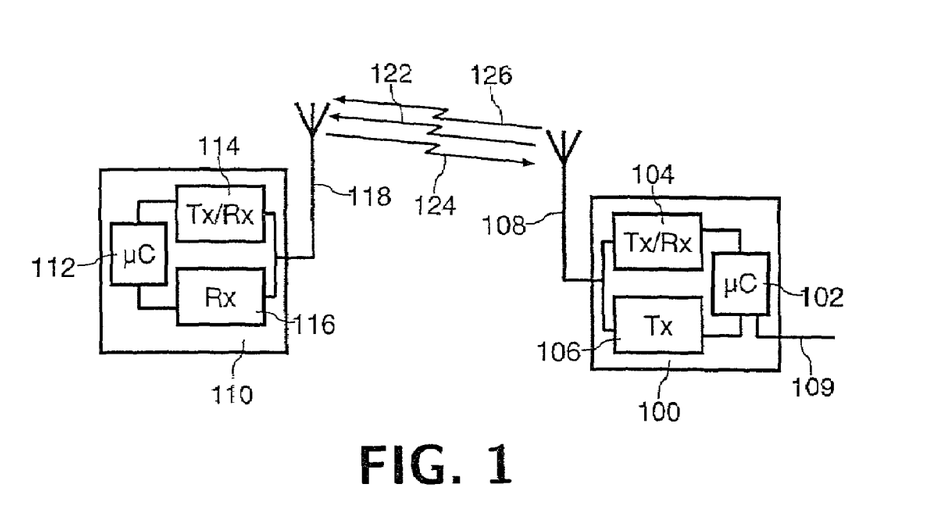
FIG. 1 is a block schematic diagram of a radio communication system made in accordance with the present invention.

Referring to FIG. 1, a radio communication system made in accordance with the present invention comprises a multimode primary station (BS) 100 and at least one multi-mode secondary station (MS) 110. The BS 100 comprises a microcontroller (μC) 102, transceiver means (Tx/Rx) 104 operating in a first mode and transmitter means 106 operating in a second mode, the transceiver means 104 and transmitter means 106 being connected to antenna means 108. The antenna means 108 may comprise a shared antenna for use with both modes, or one or more antennas dedicated to each mode. The BS 100 further comprises connection means 109 for connection to the PSTN or other suitable network. Optionally, a transceiver operating in the second mode may be substituted for the transmitter 106.

Although a single multi-mode BS 100 is shown in FIG. 1, equivalent functionality could be provided by two (or more) single-mode primary stations linked together. In either case similar links between protocol stacks for the modes would be required, but in a multi-mode BS 100 the links could be implemented internally by software while in a linked configuration the links would need to be carried by a physical connection.

A MS 110 comprises a microcontroller (μC) 112, transceiver means (Tx/Rx) 114 operating in the first mode and receiver means (Rx) 116 operating in the second mode, the transceiver means 114 and receiver means 116 being connected to antenna means 118.

Communication between the transceiver 104 of the BS 100 and the transceiver 114 of the MS 110 takes place on a first mode downlink channel 122, while communication in the opposite direction between the transceivers 114,104 takes place on a first mode uplink channel 124. In addition, communication between the transmitter 106 of the BS 100 and the receiver 116 of the MS 110 takes place on a second mode downlink channel 126. Hence, the first mode operates over a bi-directional connection while the second mode operates over a downlink-only connection. The connection via the second mode may operate over substantially the same time as that via the first mode. However, connections in either mode need not be continuous. For example, in a multimedia Internet browsing session, the first mode may use a packet access scheme, on an unreserved channel, to send and receive basic information, whilst the second mode connection may be initiated to download blocks of data, then closed again when not required.

In an alternative to the system shown in FIG. 1, the second mode might comprise only an uplink channel. In some circumstances this could lead to cost and power savings. For example if the second mode is simple (such as a straightforward Frequency Modulation (FM) system), it might be a cheaper way to provide uplink capacity than use of the first mode uplink channel 124.

First Embodiment

In a first embodiment of the present invention the first mode is UMTS TDD while the second mode is HIPERLAN/2. This embodiment provides a high-speed data link between BS 100 and MS 110 while avoiding the need for a HIPERLAN/2 transmitter in the MS 110. Since such a transmitter is required to be highly linear it is inherently inefficient, and therefore potentially expensive and power-hungry. Its omission from the MS 110 therefore results in a significant cost, weight and power savings.

Figure 2:
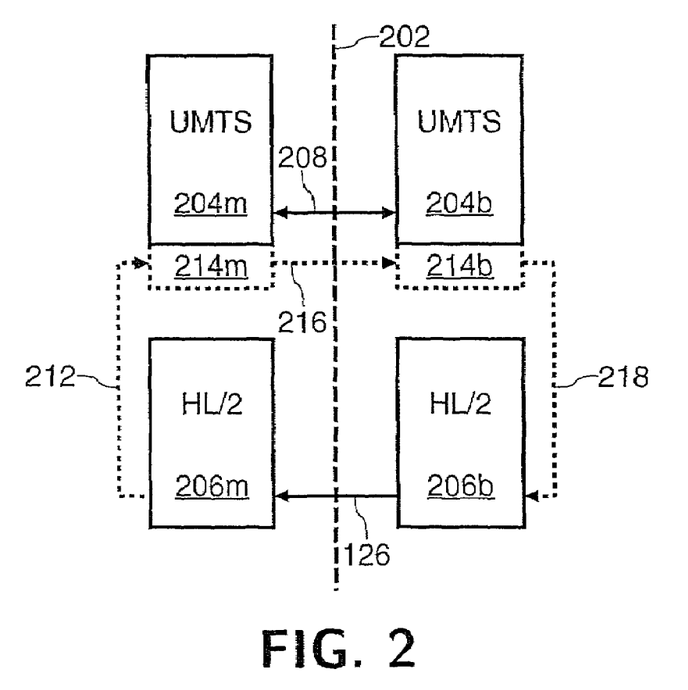
FIG. 2 illustrates modifications required to UMTS and HIPERLAN/2 protocol stacks to enable the HIPERLAN/2 uplink to be omitted.

However, the omission of the HIPERLAN/2 uplink means that the control traffic that would otherwise be transmitted on this channel must be carried in some other way. FIG. 2 shows one possible set of modifications to UMTS TDD mode and HIPERLAN/2 protocols to enable implementation of the system shown in FIG. 1. In this embodiment the uplink part of the HIPERLAN/2 protocol is carried by an extension to the UMTS physical layer. The dashed line 202 represents the air interface, with the protocol stacks for the MS 110 on the left of the line 202 and the protocol stacks for the BS 100 on the right of the line 202. The BS 100 has a conventional UMTS protocol stack 204*b* and a HIPERLAN/2 protocol stack 206*b*, while the MS 110 has a conventional UMTS protocol stack 204*m* and HIPERLAN/2 protocol stack 206*m*. Bi-directional communication between the UMTS protocol stacks 204*b*,204*m* takes place over a conventional UMTS communication channel 208, while downlink communication between the HIPERLAN/2 protocol stack 206*b* in the BS 100 and the HIPERLAN/2 protocol stack 206*m* in the MS 110 takes place over a conventional HIPERLAN/2 communication channel 126.

The additional protocol stacks and communication channels required are shown in dashed lines. Instead of a HIPERLAN/2 uplink channel, the HIPERLAN/2 protocol stack in the MS 110 has an internal communication channel 212 to an extension 214*m* to the physical layer part of the UMTS protocol stack 204*m*. The extension 214*m* performs suitable protocol conversions and transmits the HIPERLAN/2 uplink data over a UMTS communication channel 216 to the BS 100, where it is received by another extension 214*b* to the physical layer part of the UMTS protocol stack 204*b*. After suitable protocol conversion is performed, the uplink data is passed over an internal communication channel 218 to the HIPERLAN/2 protocol stack 206*b* where it is acted on as if it had arrived over a conventional HIPERLAN/2 uplink channel.

Figure 3:
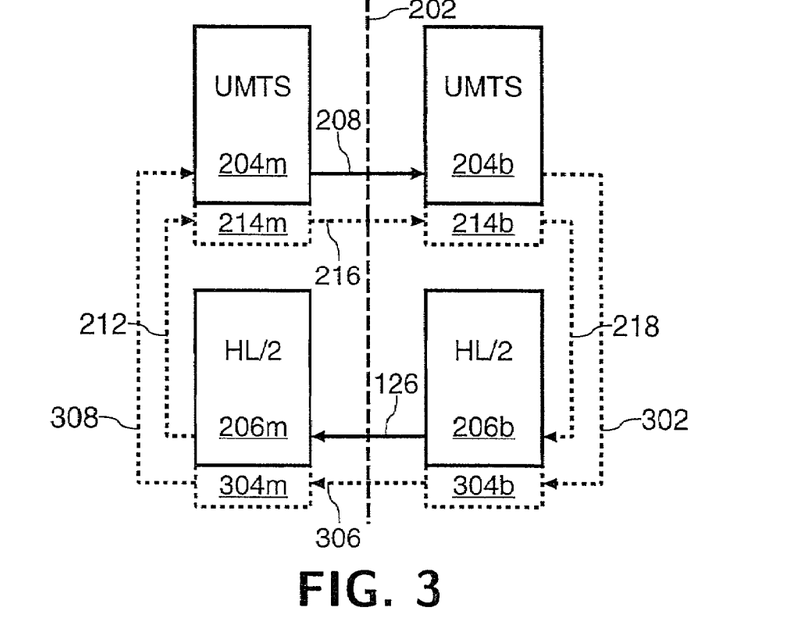
FIG. 3 illustrates further modifications to the protocol stacks of FIG. 2 to enable the UMTS downlink to be omitted.

As a further modification, it is possible to use a single radio interface in the downlink 122 by sending the signalling required for the UMTS TDD downlink over the HIPER- LAN/2 downlink 126. FIG. 3 shows the further modifications required to the protocol stacks and communication channels of FIG. 2. The UMTS communication channel 208 now operates in an uplink direction only. Data relating to the UMTS downlink is carried over an internal communication channel 302 in the BS 100 where it is handled by an extension 304b to the physical layer part of the HIPERLAN/2 protocol stack 206b. The extension 304b performs suitable protocol conversions and transmits the UMTS downlink data over a HIPERLAN/2 communication channel 306 to another extension 304m to the HIPERLAN/2 protocol stack 206m in the MS 110. After suitable protocol conversion, the data is passed over an internal communication channel 308 to the UMTS protocol stack, where it is acted on as if it had arrived over a conventional UMTS downlink channel.

Figure 4:
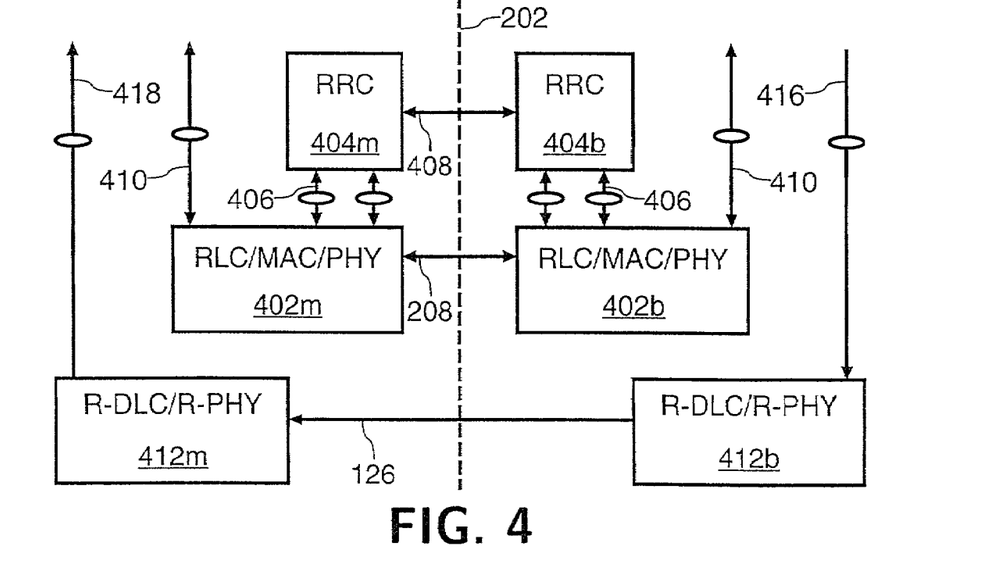
FIG. 4 shows a radio interface stratum model for UMTS modified to interface with a HIPERLAN/2 downlink.

Now consider the modifications required in more detail. FIG. 4 shows a radio interface stratum model of a UMTS system, modified to incorporate a HIPERLAN/2 downlink. This figure is derived from the stratum model presented in FIG. 1c of UMTS technical specification TS25.301, version 3.5.0, published by the Third Generation Partnership Project (3GPP) and available on the Internet at http://www.3gpp.org/ftp/Specs/2000-06/R1999/25_series/25301-350.zip. The dashed line 202 represents the air interface, with the MS 110 on the left of the line 202 and the BS 100 on the right of the line 202.

The radio interface comprises three protocol layers: a physical layer, a data link layer and a network layer. A radio interface 402b in the BS 100 comprises Radio Link Control (RLC), Medium Access Control (MAC) and the PHYsical layer (PHY), communicating across a UMTS communication link 208 with a radio interface 402m in the MS 110. A first Radio Resource Controller (RRC) 404b in the BS 100 controls the operation of the radio interface via control links 406, while a second RRC 404m performs a similar function in the MS 110. The first and second RRC 404b,404m communicate over a conceptual link 408 (which is in fact carried over the communication link 208). Bearers 410 carry data in both directions between higher protocol layers and the radio interface 402b in the BS 100, and between higher protocol layers and the radio interface 402m in the MS 110.

The HIPERLAN/2 downlink is represented by a radio interface 412b in the BS 100, comprising a Radio Data Link Control (R-DLC) and Radio PHYsical layer (R-PHY) and a radio interface 412m in the MS 110. The radio interfaces 412b,412m communicate over a downlink HIPERLAN/2 communication link 126. Downlink data is carried from higher protocol layers to the radio interface 412b by bearers 416 and from the radio interface 412m to higher protocol layers by bearers 418.

The ovals in the control links 406 and bearers 410,416, 418 represent service access points, for which interfaces are defined in the UMTS specifications.

Figure 5:
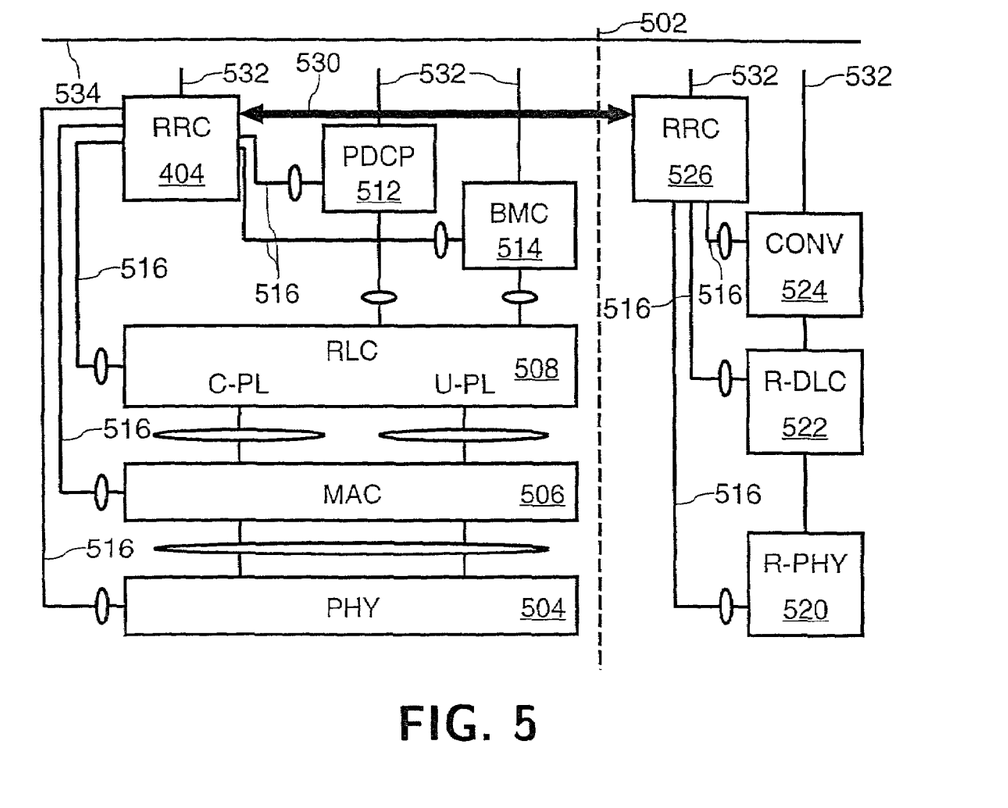
FIG. 5 shows a UMTS-based radio interface protocol architecture for a combined UMTS and HIPERLAN/2 terminal.

FIG. 5 shows a protocol architecture for the first embodiment, applicable to a BS 100 or a MS 110, derived from the UMTS protocol architecture presented in FIG. 2 of UMTS technical specification TS25.301. UMTS protocol elements are drawn to the left of the dashed line 502, while HIPERLAN/2 protocol elements are drawn to the right of the line 502. The UMTS protocol stack comprises a physical layer 504, a MAC sub-layer 506, a RLC sub-layer 508, a RRC 404, a Packet Data Convergence Protocol (PDCP) sub-layer 512 and a Broadcast/Multicast Control (BMC) sub-layer 514. The RRC 404 has control connections 516 to each of the above-mentioned layers and sub-layers, enabling it to control the configuration of the lower layers. The service access points between the physical layer 504 and MAC sub-layer 506 are for physical transport channels, while those between the MAC sub-layer 506 and the RLC sub-layer 508 are for logical channels. The RLC 508 is divided into control (C-PL) and user (U-PL) planes.

The HIPERLAN/2 protocol stack comprises a physical layer 520, a R-DLC layer 522, CONVergence sublayer (CONV) 524 and a HIPERLAN/2 RRC 526. The convergence sublayer 524 provides quality of service information, as well as functionality for segmentation and reassembly of data. The RRC 526 has control connections 516 to each of the HIPERLAN/2 layers. The UMTS and HIPERLAN/2 RRCs 404,526 communicate via a RRC interlink 530. A plurality of data links 532 are provided for communication with higher layers above the boundary 534 of the radio interface.

It is preferable for the UMTS connection to be set up first. In particular, this allows for a continuous UMTS session with a HIPERLAN/2 downlink being initiated when required. The RRC interlink 530 enables information to be exchanged directly between the RRC components in HIPERLAN/2 and UMTS. Primarily, this means that in the base station control signalling sent on the UMTS uplink 124 can be routed to the HIPERLAN/2 RRC 526 and used to set up a HIPERLAN/2 downlink data channel. Similarly, at the terminal 110, control information (if not sent on the HIPERLAN/2 downlink 122) could be received on the UMTS downlink and be routed to the HIPERLAN/2 RRC 526, so that the HIPERLAN/2 receiver can be correctly configured.

Figure 6:
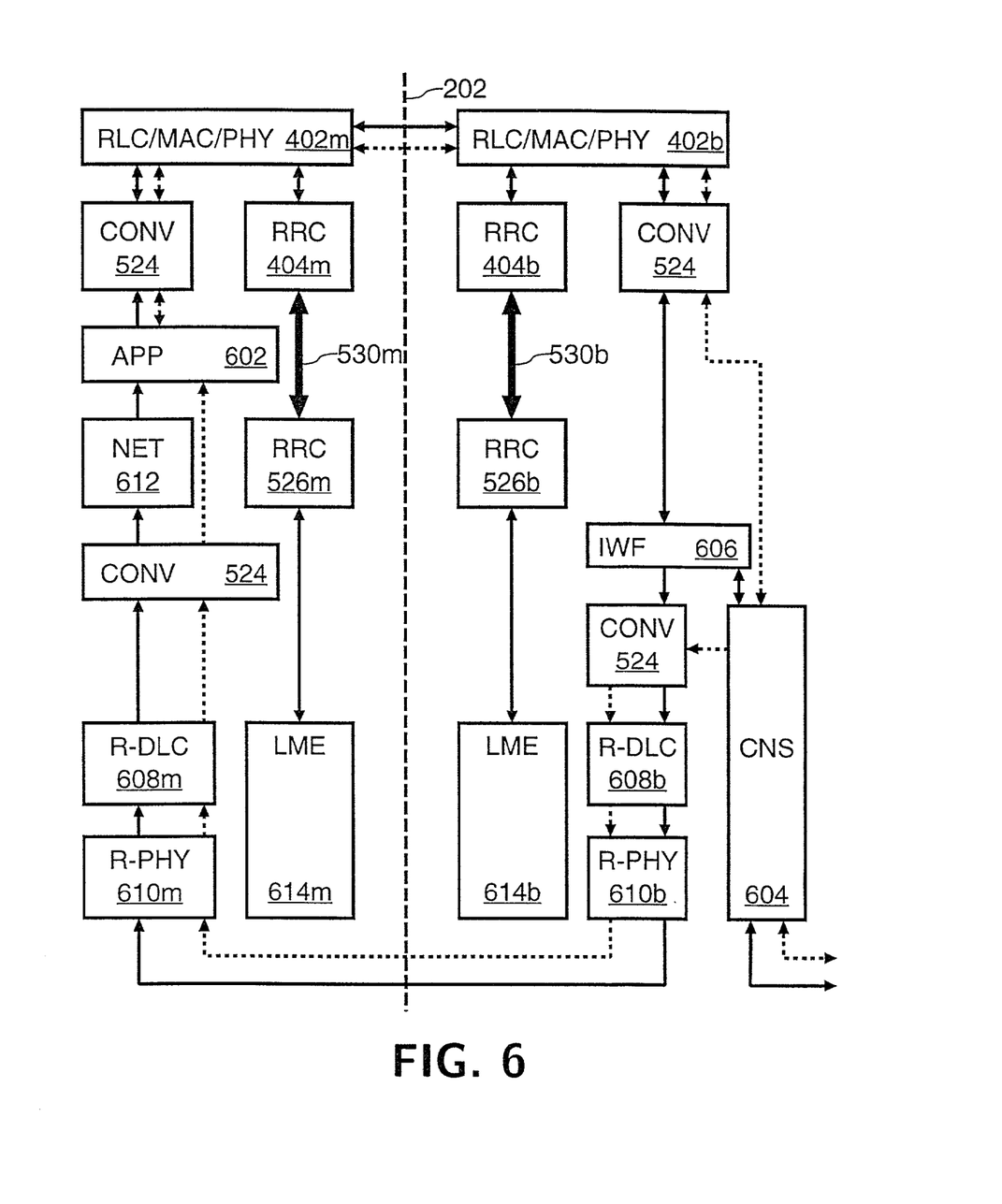
FIG. 6 shows a HIPERLAN/2-based radio interface architecture for a combined UMTS and HIPERLAN/2 system.

An alternative radio interface architecture for the first embodiment is shown in FIG. 6. This is derived from the HIPERLAN/2 layer architecture presented in FIG. 5b of Technical Report TR 101 031, version 2.2.1, published by the European Telecommunications Standards Institute (ETSI), and available on the Internet at http://www.etsi.org/. The dashed line 202 represents the air interface, with the MS 110 on the left of the line 202 and the BS 100 on the right of the line 202. Flow of control data between blocks is indicated by solid lines, with arrows indicating the direction or directions of data flow. Flow of user data between blocks is indicated similarly but using dashed lines.

An application 602 runs in the MS 110. The application communicates, via a convergence sublayer 524, with the UMTS radio interface 402b over bi-directional control and data channels. Bi-directional communication between the UMTS radio interfaces 402m,402b in the MS 110 and BS 100 respectively takes place across the air interface 202. The operation of each of the UMTS radio interfaces 402m,402b is controlled by a respective RRC 404m,404b.

User data passes between the UMTS radio interface 402b in the BS 100 and a HIPERLAN/2 Core Network Stack (CNS) 604 via a convergence sublayer 524. Control data passes between the radio interface and an InterWorking Function (IWF) 606 via the same sublayer 524. The IWF 606 translates between the internal interface of a HIPERLAN/2 network and other network interfaces (such as UMTS). The CNS 604 provides the interface for user and control data between a HIPERLAN/2 system and the PSTN or other external network.

Control and user data for transmission over a HIPERLAN/2 downlink pass from the CNS 604 via the IWF 606 and a convergence sublayer 524 to a R-DLC 608b and a transmit-only physical layer 610b. The data is transmitted over a HIPERLAN/2 downlink channel to a receive-only physical layer 610m, a R-DLC 608m and a convergence sublayer 524 in the MS 110. User data then passes directly to the application 602, while control data passes to the application 602 via a network stack (NET) 612. HIPER-LAN/2 RRCs 526b,526m are provided in the BS 100 and MS 110 respectively. Each communicates with a respective UMTS RRC 404b,404m over a respective RRC interlink 530b,530m, as described above. Each HIPERLAN/2 RRC 526b,526m also communicates with a respective Layer Management Entity (LME), which forms part of the DLC layer and is used to convey traffic contract information and performance requirements between the DLC layer and higher connection control functions.

Figure 7:
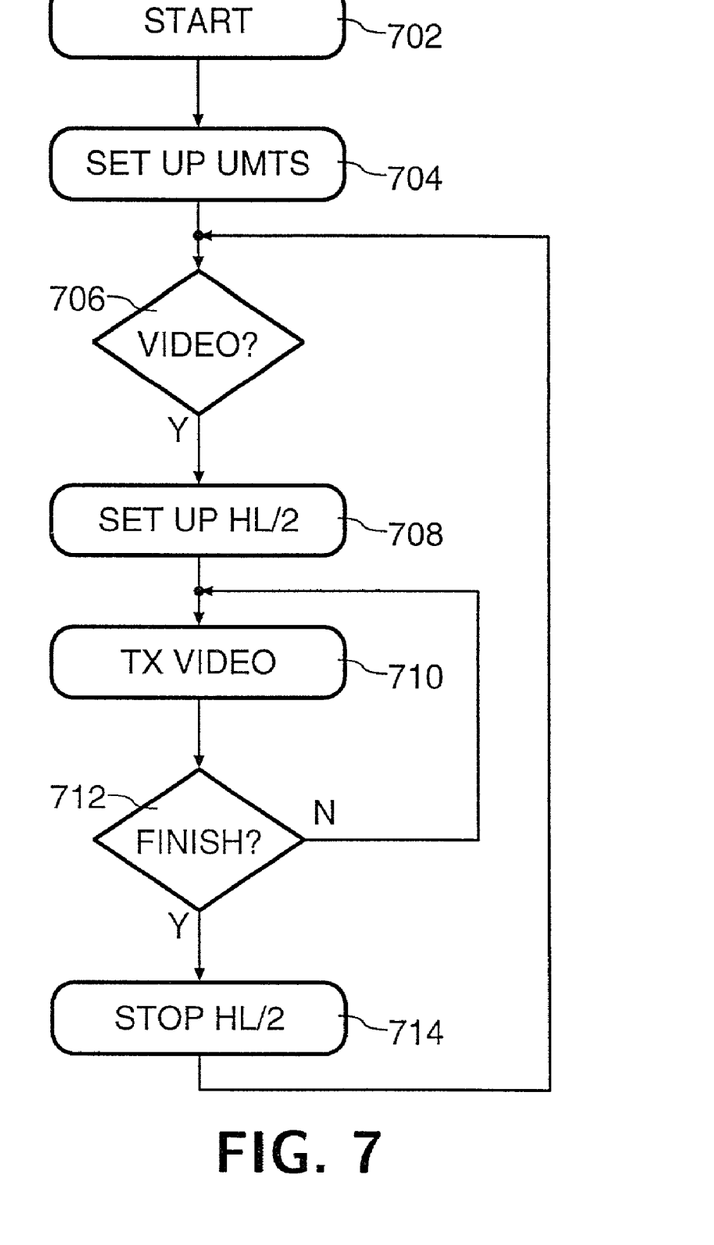
FIG. 7 is a flow chart illustrating a method of operating a combined UMTS and HIPERLAN/2 system.

A method of operating a system made in accordance with the first embodiment is illustrated in FIG. 7. The method begins at step 702 when a MS 110 is turned on. First a bi-directional UMTS TDD link is initiated with a BS 100, at step 704. Following this the UMTS link is used in the normal manner, for example for a web browsing session. At some point in the session the user selects a video stream to view, which results in the test 706 being passed. As a result, a HIPERLAN/2 link is initiated at step 708, and this link is used for transmission of the video stream to the MS 110. The end of the video stream is checked for at step 712, and when it is detected the HIPERLAN/2 link is terminated and the system returns to test 706 to wait for another video stream to be requested. Optionally, a time out may be provided between the end of a video stream and the termination of the HIPERLAN/2 connection to avoid the overheads of closing one connection and initiating another if a further video stream is selected after a short time.

The first embodiment, as described above, relates to the combination of UMTS TDD mode with HIPERLAN/2. Since both systems operate using TDMA (Time Division Multiple Access) methods, their coexistence in a terminal is relatively straightforward and may give rise to some scope for component sharing. There might however be a requirement for some timing synchronisation between the two systems. A variation of the first embodiment using UMTS FDD mode instead of UMTS TDD mode could be implemented. A minor disadvantage of such a combination is that the UMTS communication channel 208 would run simultaneously with the HIPERLAN/2 downlink 126, which might require additional hardware resources.

Second Embodiment

In a second embodiment of the present invention the first mode is DECT (Digital Enhanced Cordless Telecommunications) while the second mode is HIPERLAN/2. This embodiment, in common with the first embodiment, provides a high-speed data link between BS 100 and MS 110 while avoiding the need for a HIPERLAN/2 transmitter in the MS 110.

Figure 8:
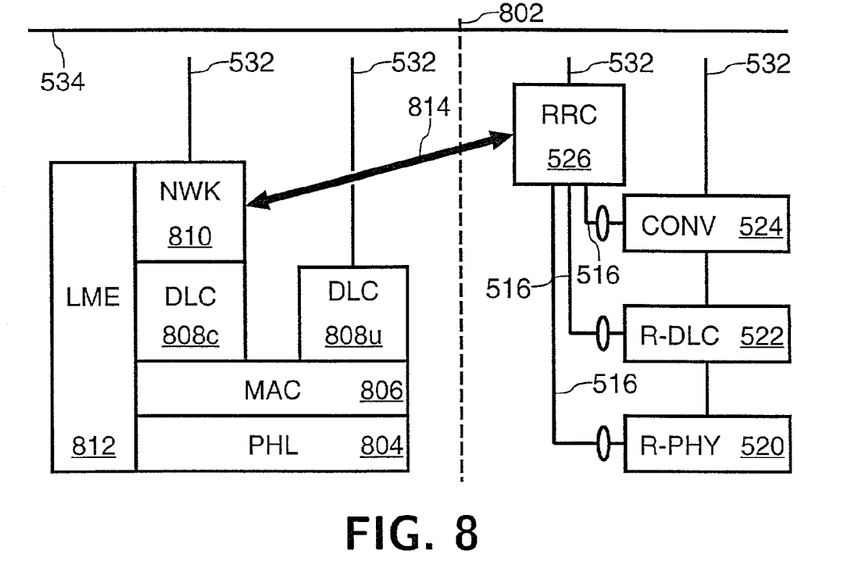
FIG. 8 shows a DECT-based radio interface protocol architecture for a combined DECT and HIPERLAN/2 terminal.

A protocol architecture for a combined DECT and HIPERLAN/2 terminal is shown in FIG. 8. This is derived from the DECT layered structure presented in FIG. 5b of European Standard EN 300 175-1, version 1.4.2, published by the European Telecommunications Standards Institute (ETSI), and available on the Internet at http://www.etsi.org/. DECT protocol elements are drawn to the left of the dashed line 802 while HIPERLAN/2 protocol elements are drawn to the right of the line 802. The HIPERLAN/2 elements, data links 532 and boundary 534 are equivalent to those shown in FIG. 5, as discussed above.

The lowest layer of the DECT protocol stack comprises a PHysical Layer (PHL) 804, which communicates with a MAC layer 806. Above the MAC layer 806 the stack is split into control and user planes. In the user plane a first DLC layer 808u communicates with the MAC layer 806 and higher layers. In the control plane a second DLC layer 808c communicates with the MAC layer 806 and with higher layers via a network layer (NWK) 810. A LME layer 812 co-ordinates the various parts of the protocol stack.

In use, when a HIPERLAN/2 downlink connection is required, the DECT NWK layer 810 and HIPERLAN/2 RRC 526 exchange information via a NWK/RRC interlink 814 to enable a HIPERLAN/2 downlink to be set up in the user plane, in a similar manner to the first embodiment.

Third Embodiment

In a third embodiment of the present invention the first mode is Bluetooth while the second mode is HIPERLAN/2. This embodiment, in common with the first and second embodiments, provides a high-speed data link between BS 100 and MS 110 while avoiding the need for a HIPERLAN/2 transmitter in the MS 110.

Figure 9:
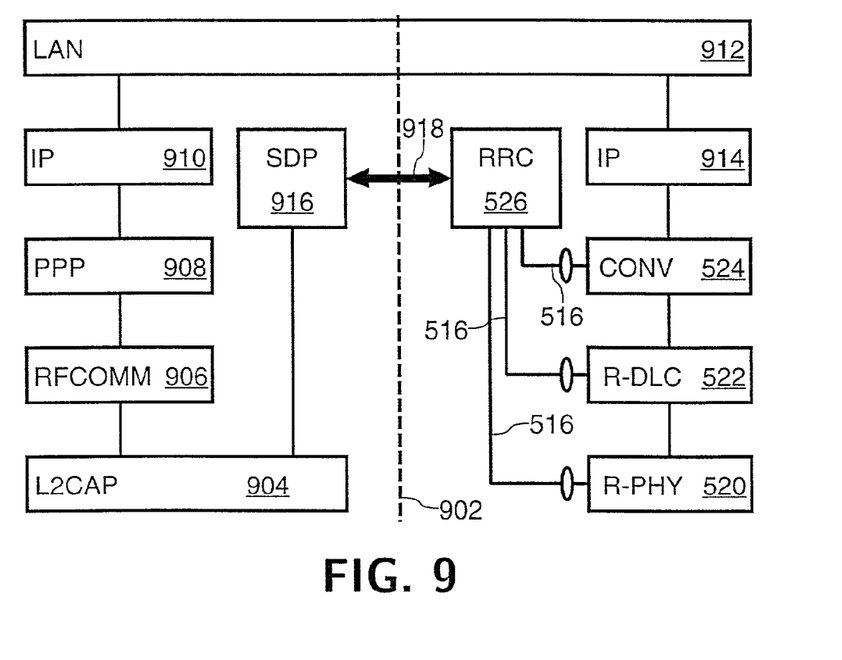
FIG. 9 shows a Bluetooth-based radio interface protocol architecture for a combined Bluetooth and HIPERLAN/2 terminal.

A protocol architecture for a combined Bluetooth and HIPERLAN/2 terminal operating a LAN access application is shown in FIG. 9. This is derived from FIGS. 1 and 5 of the white paper "Bluetooth Protocol Architecture", version 1.0, published by the Bluetooth Special Interest Group and available on the Internet at http://www.bluetooth.com/developer/whitepaper/whitepaper.asp. Bluetooth protocol elements are drawn to the left of the dashed line 902 while HIPERLAN/2 protocol elements are drawn to the right of the line 902. The HIPERLAN/2 elements are equivalent to those shown in FIGS. 5 and 8, as discussed above.

The Bluetooth protocol stack comprises a Logical Link and Control Adaptation Protocol (L2CAP) 904 which communicates using a serial cable emulation protocol layer (RFCOMM) 906 with a Point-to-Point Protocol (PPP) layer 908. This layer translates the data for an Internet Protocol (IP) layer 910 which communicates with a LAN application 912. The LAN application 912 also communicates with the HIPERLAN/2 protocol stack via an IP layer 914.

Control of the Bluetooth connection is made by a Service Discovery Protocol (SDP) layer 916. The SDP layer 916 communicates with the HIPERLAN/2 RRC 526 via an interlink 918, enabling the LAN application to be set up to allow transfer of data via a HIPERLAN/2 downlink.

Fourth Embodiment

In a fourth embodiment of the present invention the first mode is UMTS TDD mode while the second mode is UMTS FDD mode. Requirements for third generation systems such as UMTS include:

support for asymmetric traffic;

roaming between areas using different frequency allocations;

support for different frequency bands which may become available in the future; and minimal complexity in the MS 110.

Neither of the UMTS modes of operation is ideal for fulfilling all of these requirements alone:

FDD can support asymmetric traffic, but the level of asymmetry (over the total traffic) is fixed with the frequency allocations, and cannot be changed.

To support future frequency bands and enable global roaming, a TDD terminal will need to transmit and receive in several different bands, which increases cost of a terminal 110.

Furthermore, there are enhancements being considered to provide high speed packet delivery to terminals 110 using FDD, which are not currently considered for TDD.

A hybrid system, made in accordance with the fourth embodiment of the present invention, overcomes these problems and benefits from the advantages of both modes of operation.

In this embodiment there are two, or more, distinct frequency bands available. Within one band, TDD mode is deployed, capable of operating in both uplink and downlink. Within the other bands, FDD mode is deployed, in the downlink only. All uplink transmission takes place within the TDD band. By varying the ratio of uplink to downlink within the TDD band, it is possible to vary the asymmetry of the radio link, and hence efficiently support asymmetric traffic of varying loads.

Preferably the TDD band is chosen to be common between different areas, enabling a MS 110 to be made which supports this band for its transmission and reception, and possibly other FDD bands for reception (based around those used within its common areas of use). When roaming it would always be able to communicate via the TDD band, and local terminals 110 could use the FDD band for their downlink in order to distribute the load. As other frequency bands become available, terminals 110 could be made to support them for their FDD downlink, whilst the system would still be fully backwards and forwards compatible by use of the TDD band, and any existing FDD bands.

The requirement that a MS 110 would only need to transmit within one TDD band would minimise the cost and complexity of the transmit parts of the terminal 110. It would also be possible to build a terminal 110 which received high speed data in the downlink via the FDD band, thereby removing the need for complex Joint Detection/Multi-User Detection (JD/MUD) capabilities. JD/MUD, as typically used in UMTS TDD mode, requires significant processing power because multiple signals (usually for different users) are decoded together, rather than decoding just the signal for one user and treating the others as noise. Hence, avoiding the need to use JD/MUD is a significant advantage for the system.

A scheme in accordance with the fourth embodiment would also allow enhancements to either TDD or FDD to be offered (e.g. high speed downlink packet access for FDD), and used within any suitably-configured MS 110.

It is possible that the FDD downlink bands may be configured to work either according to the fourth embodiment of the present invention, or as the downlink in a current paired FDD spectrum scheme, and would be capable of supporting both types of users at the same time.

If there a requirement emerges for predominantly high rate uplink asymmetry (in contrast to the high rate downlink asymmetry considered for the first three embodiments), it may be effective to consider the use of FDD bands for uplink only, with TDD supporting the mix of uplink and downlink. An example of an application which could take advantage of high rate uplink asymmetry is sending a video news report from the location of an incident via wireless means. Although there might be no cost saving in implementing a MS 110 capable of such functionality, it would handle the required asymmetric traffic without consuming excessive system resources.

Fifth Embodiment

In a fifth embodiment of the present invention the first mode can be any of the first modes described above, while the second mode is a mode tailored to the particular application requirements (which may be non-standard, or one mode chosen from a range of available standard modes). Such a scheme is particularly suitable to a system in which radio interface specifications (or optionally software modules to implement them) can be downloaded, for example that disclosed in our co-pending International Patent Application PCT/EP00/03068 (our reference PHB 34339, unpublished at the filing date of the present application). The interface specifications (and/or modules) may be downloaded via the first mode downlink channel 122. Alternatively they may be obtained from another broadcast system, or even via the Internet, with instructions for where to obtain them being transmitted via the first mode downlink channel 122.

The embodiments described above represent examples of how protocols relating to different communication modes may be interconnected to enable one or more communication channels to be eliminated in a multi-mode system. However, they are not to be construed as limiting and other embodiments achieving the same or similar effects are considered to be within the scope of the present invention.

In any embodiment based on any existing or future standards, it may be desirable to make minor modifications to such standards, in order to facilitate implementation. For example, standardised protocols may be subject to timing constraints such as the maximum time interval allowed between sending a transmission and receiving a response. In some cases these constraints may not be easily met when different systems are interconnected. This problem might be solved by altering the timing constraints or by adjusting the initial values of timers in the protocols (where these timers may be used to determine time-out periods).

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system having a communication channel between a primary station and a secondary station, the primary and secondary stations having means for communicating according to first and second two-way communication modes, wherein the communication channel comprises at least one of an uplink and a downlink channel for the first mode and one of an uplink and a downlink channel for the second mode, the other channel for the second mode being absent, wherein means are provided for transmitting and receiving data normally routed via an absent channel of one mode via a respective channel of the other mode; and means are provided for transmitting information about a radio interface specification defining the second mode to the secondary station via the downlink communication channel of the first mode.

2. A system as claimed in claim 1, wherein the first mode is one of UMTS TDD, DECT or Bluetooth.

3. A system as claimed in claim 1, wherein the second mode is HIPERLAN/2 or UMTS FDD.

4. A system as claimed in claim 1, wherein the communication channel for the first mode is only operable in both of an uplink and a downlink direction.

5. A system as claimed in claim 1, wherein the communication channel for the first mode is only operable in the one of the uplink and the downlink channel not provided for the second mode, and means are provided for transmitting and receiving data normally routed via the absent channel of the first mode via a present channel for the second mode.

6. A primary station for use in a radio communication system having a communication channel between the primary station and a secondary station, wherein means are provided for communicating according to first and second two-way communication modes, the communication channel comprises at least one of an uplink and a downlink channel for the first mode and one of an uplink and a downlink channel for the second mode, the other channel for the second mode being absent, wherein means are provided for transmitting or receiving data normally routed via an absent channel of one mode via a respective channel of the other mode; and means are provided for transmitting information about a radio interface specification defining the second mode to the secondary station via the downlink communication channel of the first mode.

7. A primary station as claimed in claim 6, wherein the means for communicating according to the first communication mode and the means for communicating according to the second communication mode are located in separate stations and in that a communication link is provided between the stations.

8. A primary station as claimed in claim 6, wherein the information comprises the specification itself.

9. A primary station as claimed in claim 6, wherein the information comprises a software module for implementing the specification.

10. A primary station as claimed in claim 6, wherein the information comprises the location of a source from which the secondary station can obtain the specification.

11. A secondary station for use in a radio communication system having a communication channel between a primary station and the secondary station, wherein means are provided for communicating according to first and second two-way communication modes, the communication channel comprises at least one of an uplink and a downlink channel for the first mode and one of an uplink and a downlink channel for the second mode, the other channel for the second mode being absent, wherein means are provided for transmitting or receiving data normally routed via an absent channel of one mode via a respective channel of the other mode; and means are provided for receiving information about a radio interface specification defining the second mode transmitted by the primary station via the downlink communication channel of the first mode and for implementing the second mode in response to the received information.

12. A secondary station as claimed in claim 11, wherein the means for implementing the second mode comprise means for obtaining a specification for the second mode from a source specified by the primary station.

13. A method of operating a radio communication system having a communication channel between a primary station and a secondary station, wherein the system supports communications according to first and second two-way communication modes, the communication channel comprises at least one of an uplink and a downlink channel for the first mode and one of an uplink and a downlink channel for the second mode, the other channel for the second mode being absent, and the method comprises transmitting and receiving data normally routed via an absent channel of one mode via a respective channel of the other mode; and the primary station transmitting information about a radio interface specification defining the second mode to the secondary station via the downlink communication channel of the first mode and by the secondary station implementing the second mode in response to the transmitted information.

14. A method as claimed in claim 13, wherein the second mode is activated and deactivated as required while the first mode remains active.

15. A communication station for communication with a further station, said communication station comprising:
  a first transceiver configured to at least one of transmit first information over a first communication link in a first mode, and receive second information over a second communication link in said first mode;
  at least one of a transmitter and receiver configured to at least one of transmit and receive third information over a third communication link in a second mode;
  wherein when at least one of said first communication link and said second communication link is not available, then at least one of said first information and said second information is communicated to said communication station via said third communication link in said second mode, wherein at least one of said first transceiver and said transmitter is configured for transmitting specification information about a radio interface specification defining said second mode, said specification information being transmitted to said further station via at least one of said first communication link and said second communication link.

16. The communication station of claim 15, further comprising a converter configured to convert mode one data related to said first mode and received over said third communication link in said second mode to converted data that is further processed as if received via one of said first communication link and said second communication link associated with said first mode.

17. The communication station of claim 15, wherein said communication via said third communication link is at a higher communication rate than via at least one of said first communication link and said second communication link.

18. The communication station of claim 15, wherein said third communication link is configured for use for at least one of communicating video data and web browsing.

* * * * *